United States Patent
Wallick

[19]

[11] Patent Number: 5,929,767
[45] Date of Patent: Jul. 27, 1999

[54] EARTHQUAKE DETECTOR AND ALARM

[76] Inventor: William Owen Wallick, 909 N. 78th St., Seattle, Wash. 98103

[21] Appl. No.: 08/832,823

[22] Filed: Apr. 4, 1997

Related U.S. Application Data

[63] Continuation-in-part of application No. 08/626,719, Apr. 1, 1996, abandoned.

[51] Int. Cl.[6] .................................................. G08B 21/00
[52] U.S. Cl. .......................... 340/690; 340/689; 340/601; 200/61.45 R
[58] Field of Search ..................................... 340/690, 689, 340/601, 687; 200/61.45 R, 61.52

[56] References Cited

U.S. PATENT DOCUMENTS

| | | | |
|---|---|---|---|
| 4,359,722 | 11/1982 | Valdez et al. | 340/540 |
| 4,789,922 | 12/1988 | Cheshire | 340/690 X |
| 4,841,288 | 6/1989 | Addicks | 340/690 |
| 4,945,347 | 7/1990 | Perry | 340/689 |
| 5,101,195 | 3/1992 | Caillat et al. | 340/690 |
| 5,475,372 | 12/1995 | Burke | 340/690 |
| 5,539,387 | 7/1996 | Gitlis et al. | 340/690 |
| 5,596,183 | 1/1997 | Haley | 200/61.45 R |

*Primary Examiner*—Jeffery A. Hofsass
*Assistant Examiner*—Anh La
*Attorney, Agent, or Firm*—Graybeal Jackson Haley LLP

[57] ABSTRACT

The present invention is an earthquake detector and alarm system designed to detect even very low seismic vibration activity and warn the user. The present invention's detector sensor is selective to certain frequencies that are most probable in seismic activity and resistant to frequencies not typical in seismic activity, thus providing a high level of seismic activity detection and a low level of false triggers from non-seismic sources. It's purpose is to notify dwelling occupants that an earthquake is underway thus removing doubt that emergency action should be immediately taken. The clear, unmistakable warning provided by the present invention is valuable for sleeping occupants who might otherwise sleep through the initial activity in a seismic event, loosing valuable time to take emergency actions. The present invention is a capable piece of safety equipment which can give early seismic detection and warning, providing the opportunity for occupants to begin emergency action at the earliest possible moment.

21 Claims, 11 Drawing Sheets

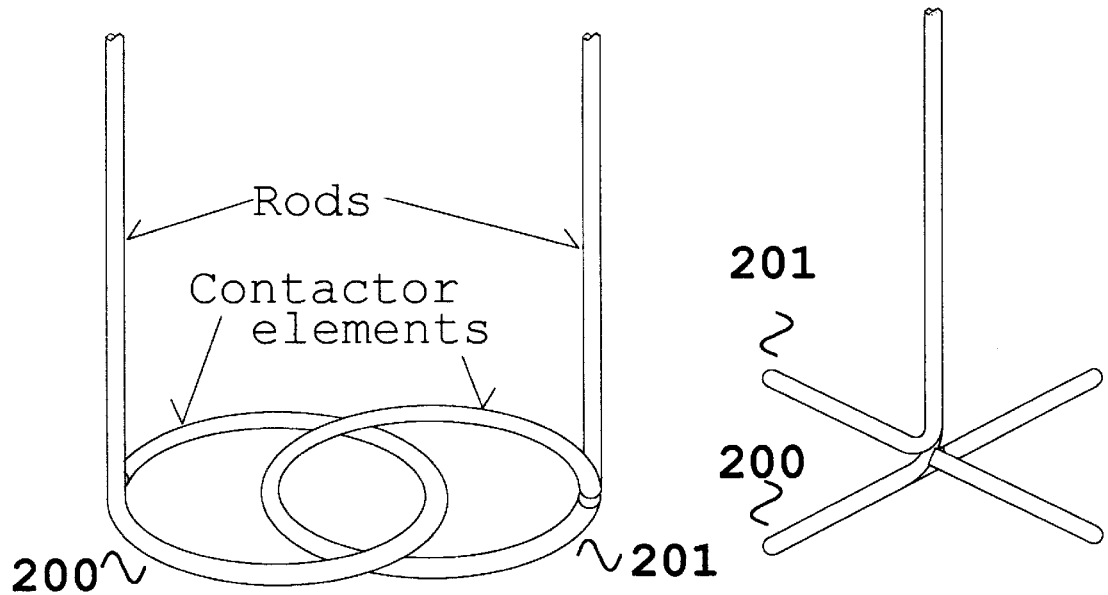
Fig. 6A — Front View
Fig. 6B — Right Side View
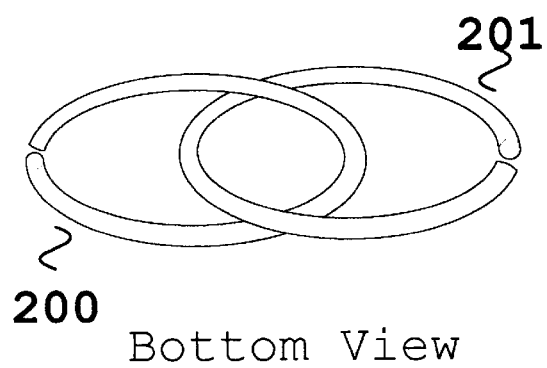
Fig. 6C — Bottom View

EARTHQUAKE DETECTOR AND ALARM

This application is a continuation-in-part of application Ser. No. 08/626,719, filed Apr. 1, 1996, now abandoned.

FIELD OF INVENTION

The present invention relates generally to a vibration detector, and more particularly to an earthquake detector and alarm which utilizes two or more tuned simple pendulums, each coupled to earth and summed to each other, to selectively detect seismic vibrations.

BACKGROUND OF THE INVENTION

Earthquakes are the vibrations produced in the earth's crust when rock in which elastic strain has been building up suddenly ruptures and then rebounds. The primary waves (P waves) are compression waves and radiate in all directions from the epicenter. When the P waves reach the surface they cause movement at the surface of the earth, with vertical and horizontal components, where the magnitude of each of these components is dependent on the incident angle of the wave and geological factors. Once at the surface, the P waves are reflected and refracted so as to form secondary waves (S waves). The S waves impart both vertical and horizontal movement to the surface of the earth. Sensing the earlier P waves, or the S waves they instantaneously generate, provides the earliest warning that an earthquake is arriving. Most of the slower traveling, and typically larger S waves arrive later but are more destructive than the P waves because their motion is largely horizontal. Personal injury from earthquakes can best be reduced by thorough preparation and early warning.

Unfortunately, most prior art earthquake motion detectors and alarms have been prohibitively expensive, insensitive, or plagued by false alarms. Another historical problem with earthquake motion detectors and alarms is that they required a great deal of attention in order to set up and maintain the device in proper calibration.

In Anderson et al., U.S. Pat. No. 5,418,523, a typical prior art earthquake motion detector is disclosed. The device in Anderson consists of a single pendulum enclosed in a plastic case securely attached to a vertical wall. When the pendulum sways even a minimal degree it comes in contact with an electrical sensing ring and triggers an alarm. The most significant problem with Anderson is the high probability of false detections. There is no rejection of higher frequencies or impulses in the vibration sensor. A truck driving by or a strong gust of wind are as likely to set off the alarm as seismic activity. The sensor actually amplifies a false signal, such as an impulse from a slammed door, making it very susceptible to false alarms. Too many false detections and the alarm is sure to be disconnected.

Other sensors require calibration, adjustment or some initial seismic-like activity, before the device is adequately sensitive and/or provides a minimal degree of rejection. In U.S. Pat. No 5,539,387 to Gitlis, very close manufacturing tolerances are required or the mechanism does not self align. The Gitlis compound pendulum system includes a distributed mass in one element, attached in a distributed structure that must be very accurate, or this element will tilt when at rest, either shorting the contactor or reducing the contactor gap. If a Gitlis sensor with a 1.0 mm gap is used, a mass distribution error of less than 3% will cause the contactor to short continuously, and the detector will sound an alarm until the battery is dead. A 1.5% mass distribution error can cause a partial closing of 0.5 mm of the 1.0 mm contactor gap, thus reducing half of its designed-for rejection.

There is a need for an inexpensive earthquake detector and alarm which is very sensitive to the vibration frequencies typical in earthquakes and which is not prone to false alarms.

SUMMARY OF THE INVENTION

It is generally known in physics that a perfect simple pendulum consists of a massless rod pivoted to earth on one end and having a point mass attached to the other end. Any pendulum whose behavior can be calculated using the formula for the simple pendulum, (Natural Frequency= $(½Pi)(gravity/rod length)^{1/2}$) is also typically called a simple pendulum, even though the pendulum rod has some small amount of mass. (The rod mass must be small when compared to the total mass, or the pendulum is no longer "simple.") The sensor in this patent application is comprised of two or more independent simple pendulums, each connected to earth, and the net swing of the two or more independent pendulums is summed to detect seismic activity. This use of multiple independent simple pendulums provides a higher sensitivity than prior art single pendulums such as U.S. Pat. No. 5,475,372 to Burke, U.S. Pat. No. 5,168,264 to Agustin, or U.S. Pat. No. 5,418,523 to Anderson. It also provides higher sensitivity than compound pendulum system detectors such as U.S. Pat. No. 5,539,387 to Gitlis.

Leverage gain in simple pendulums can be achieved by extending the contactor on a rod below the pendulum mass to achieve a larger swing at the contactor than at the mass in the pendulum. However, two leveraged simple pendulums that are summed will have a greater gain than one leveraged simple pendulum, providing a significant gain improvement (and other advantages described herein) over prior art where a single pendulum is leveraged by extending the contactor beyond the mass.

Leveraged gain on a single pendulum is achieved at the expense of reducing the sensor's ability to reject out of band non-seismic frequencies and reject shock from an impulse function caused by slamming doors, dropped objects and other non-seismic sources. In most dwellings, this loss of rejection will result in a multitude of false alarms, or the necessity to set the contactor gap at such a large setting that the sensor is insensitive to seismic activity. To solve this problem, Gitlis uses a combination of leveraged gain and leveraged loss. Gitlis' physical structure limits the ability to include appreciable leveraged gain on both pendulum elements, and this restraint limits the rejection that can be achieved. The rejection to a an external shock in the form of an impulse with a magnitude of 1.00 mm will cause a net change in the distance between the Gitlis contactor contacts of 0.70 mm. The same impulse will cause a net change in the distance between the present invention's contactor contacts of 0.56 mm, providing better rejection. The Gitlis design inherently provides less rejection. Additionally, as discussed later, the present invention's sensor is more sensitive than the Gitlis sensor so it can have a larger contactor gap, further improving the present invention's rejection.

The use of leverage gain on multiple pendulums as in the present invention's sensor, is necessary to achieving this improvement in rejection of above band excitations. In the sensor shown in this patent application, an error in mass distribution in either simple pendulum of 3% will only close the gap 2.7%, which will have negligible affect on rejection. The combination of better absolute impulse rejection and larger contactor gap results in a net rejection ratio between the present invention's sensor and Gitlis of greater than 2:1, providing a significant improvement over the prior art.

The present invention's sensor and the Gitlis sensor are quite different. The Gitlis sensor advanced the state of the art from a "single simple pendulum" or a "compound pendulum" to a "pendulum system." A compound pendulum is a pendulum in which the mass is distributed, not a point or near point mass. A "pendulum system" is a multiplicity of pivots, rods, masses, or compound pendulum elements which interact to define its mode of operation, and which are typically attached in series. Also, in a pendulum system, only one pivot is connected to earth. Excitation must pass through the earth connected pendulum elements to succeeding pendulum elements.

The present invention's sensor advances the state of the art from a pendulum system to a sensor which includes a multiplicity of single independent pendulums. Since Gitlis uses a pendulum system which is comprised of a compound pendulum element in series with a simple pendulum element, his sensor is a pendulum system, i.e., a combination of pendulum elements combined into a single pendulum. However, a pendulum system does not perform as well as two summed independent simple pendulums, no matter how many pendulum elements are in the pendulum system. Thus, the present invention's sensor, using a multiplicity of independent leveraged summed simple pendulums provides a significant improvement over prior art.

In addition to improved sensitivity to seismic activity and rejection to out-of-band non-seismic vibrations or impulses, the present invention's sensor provides a broader sensitivity bandwidth than the Gitlis sensor. This is important since a high gain simple pendulum or a single pendulum system has a narrow high gain peak. The single pendulum system in the Gitlis sensor has a single peak and the narrow bandwidth typically associated with a simple pendulum with low friction losses. Also, the excitation forces impinged on the second Gitlis pendulum element must pass through the first pendulum element to reach the second, thus being attenuated by the bandpass characteristics of the first pendulum element. The present invention's sensor provides a significant improvement over this prior art by designing the two or more independent leveraged simple pendulums so their natural frequencies are separated, but their near sidebands are overlapping. This technique causes a summing of sensitivity peaks of each pendulum with the close-to-peak sideband of the other pendulums that are summed with it. This results in a higher gain, with a wider sensitivity band around the multiple natural frequency peaks, plus the added benefit of a faster reduction in sensitivity as we get farther from the natural frequencies than any prior art, due to the summing of the roll-off. This wider bandwidth and faster roll-off is a significant improvement over the prior art. Each pendulum that is added and summed in the present invention's sensor increases the bandwidth of the sensor (within the seismic band) increasing the probability of detection of seismic waves.

Pumping efficiency is an important consideration in the design of a pendulum used to sense vibrations. Pumping efficiency is the ratio between the arc increase in the pendulum mass vibration, per cycle, divided by the horizontal distance the excitation moves per vibration cycle. For example, if one cycle of the earth movement is a sinusoidal waveform with a peak-to-peak movement of 2.0 microns, and if after one cycle of this earth excitation a pendulum's mass reaches a peak-to-peak swing of 4.0 microns, the pendulum has a pumping efficiency of 2.0. Factors that affect this efficiency are inertia and friction. A simple pendulum has an inertia of zero. Friction includes air and pivot friction. Since the angle of swing in a pendulum seismic sensor is small, air friction losses are minimal. The remaining factor is pivot friction. The prior art has used a point-in-a-cone pivot, a knife edge pivot, a bearing pivot, or a loop pivot. To keep costs low, one is forced to a bearing pivot or a loop pivot. A bearing pivot is either costly, or subject to seizing due to lubricant aging. The least expensive is the loop pivot. The loop pivot is comprised of interlocking loops, such as two loops in a chain, where one loop is affixed to earth and the other loop is attached to the pendulum. Loop size directly affects the frictional losses in a pivot. If the loop is too small, one loop is forced to rotate, not rock, inside the other loop. It has been determined that the inside diameter of the loops in a loop pivot must be at least about 1.5 times the rod diameter that is used to form the interconnecting loops, or a significant friction loss is encountered.

When designing pivots for a multiplicity of pendulums which are used to form a vibration sensor, rotational alignment is also an important consideration. Without rotational alignment, contactor alignment is not achieved. Again, as a means of achieving low cost, a loop pivot is desired. It has been determined that to achieve good loop pivot alignment, the inside diameter of the loops in a pivot must be about 2 times, or less, the diameter of the rod that is used to form the interconnecting loops. If the loops are larger, a significant amount of rotation in the pivot can be experienced, and a loss in rejection can occur since the contactor is partially closed by any rotation.

Because of the restraints imposed on pivot loop size due to a need to maximize pumping gain and minimize loop rotation, the pivot loop's inside diameter must be in the range of about 1.5 to 2.0 times the diameter of the rod forming the loop. The development of this loop technology and it's implementation yields a significant improvement in the state of the art. Using these design constraints with a simple pendulum, as in the present invention's sensor, yields a pumping gain efficiency of over ten while maintaining the rotational alignment within a few degrees, which allows a significant improvement in performance vs. cost over prior art. For example, in the preferred Gitlis embodiment, the sensor uses a point-in-a-cone pivot in the earth to pendulum element one pivot. This is expensive since it must be made of higher cost materials such as metals or composites, and it requires special care in manufacturing, handling, and shipping to avoid damage to the point in the pivot. In Gitlis' alternate a system of square rod loops are used, probably to optimize alignments, but no consideration is given to the large losses that will be encountered by not using a loop inside diameter at least 1.5 times the diameter of the rod, at the loop-to-loop intersection. A pendulum element using a square Gitlis loop pivot will suffer from increased breakaway and rotational friction when compared to a present invention's pivot loop, since the loop diameter at the loop-to-loop point of contact is very small when compared to the rod diameter.

Electrical contactors are a low cost way to implement the detection of sensor movement. A cost competitive design is driven to this type of contactor. A prevalent problem with metal contacts is that they are subject to contamination or corrosion unless properly designed and protected. In the switch industry, switch contacts are typically coated with a metal that will not corrode in the presence of most gas, liquid, or solid contaminants. More expensive switches are sealed to prevent contact with these contaminants. Additionally, switch contacts are designed to wipe across each other on contact, providing a self cleaning action, or they are designed to concentrate contact closure to a very small area to assure contact. Unfortunately, contactors on pendulums make contact with a tiny force, and often it is costly to protect them from contaminants. The Gitlis pendulum system is a good example of this problem. It is large, requiring a very large, expensive-to-seal case. The case includes a variety of materials, in the same chamber as the sensor, which materials may outgas and cause corrosion on the contactor contacts, and it would be difficult for the average public consumer to periodically clean the contacts.

The present invention's earthquake detector and alarm has taken a unique approach to sensor reliability while minimizing cost. The case for the present invention's detector and alarm is designed to include a separate chamber to house only the sensor. This separate chamber is molded as in integral part of the case body to minimize cost. As the sensor is being moved into place during manufacturing, ambient air is blown out of the chamber and replaced with an inert gas that is free of contaminants and will not coat or corrode the contacts. The chamber is sealed during assembly when snapping the integrated sensor and sensor chamber cap into place. By filling a sealed chamber with a known gas and choosing a gas and contactor metal combination that will not interact, very high reliability will be achieved at low cost. Additionally, the contactor will remain sensitive to very low contact pressure, allowing it to maintain it's peak sensitivity. This provides a significant improvement over the prior art.

Any earthquake detector's alarm might be set off unintentionally by a human or animal, by jumping, by slamming a door, by dropping an object, and especially by installing a new battery. The alarm must be loud and the user may do what ever is necessary to silence it. The prior art sensors have not addressed this problem, and have not made accommodations for a momentary disable. Unfortunately, the user of a prior art sensor will either remove the battery, or turn an on/off switch to off, if it is available, to silence the alarm. Once this is done, many users will neglect to return the detector to it's operational state. To eliminate this problem, the present invention's detector and alarm has a momentary disable switch. While this switch is held depressed by the user, the alarm will remain silent. To stop an alarm the user can press and immediately release the momentary switch. If the vibration or shock that caused the alarm has ceased by the time the switch is released, the unit will remain silent. The switch push button is conveniently placed so the user can grasp the case and depress the momentary switch with the same hand, while using the other hand to replace the battery. This momentary reset feature improves the state of the art by increasing the probability that the earthquake detector and alarm will remain operational.

Another unique feature of the present invention's earthquake detector and alarm is the information that is made available to the user through the audio and visual indicator. When a seismic vibration is detected, the present invention's alarm sounds a very loud, pulsating audio signal and rapidly flashes a visual indicator. When it is operational, but has not made a detection, the visual indicator blinks periodically, but at a much lower rate. If the battery voltage has dropped below a selected threshold, a unique, very short audio beep will sound at least once a minute. This unique "battery low beep" alerts the user that it is time to replace the battery. Without this unique battery low alert, there is a much higher probability that a battery death would go unnoticed, and the detector will become and remain disabled until the user discovers by other means that the battery is dead, and replaces it. This safety feature is unique and very important to the safety of earthquake detector and alarm users.

The sensor portion of the present invention has a first vibration sensor tuned to a first frequency, a second vibration sensor tuned to a second frequency (and may have additional vibration sensors tuned to additional frequencies) and a summing device which sums the response (the instantaneous amplitude) of said first vibration sensor with the response (the instantaneous amplitude) of said second vibration sensor, etc. When there is a strong enough seismic activity that an alarm should sound, the sum of the responses exceeds a predetermined threshold to cause this alarm.

Alternatively, a comparator which compares the response (instantaneous amplitude) of said first vibration sensor with a first threshold and compares the response (instantaneous amplitude) of said second vibration sensor to a second threshold may be used in place of the summing device. In the alternative system, seismic activity is indicated by the response of said first vibration sensor exceeding said first threshold and the response of said second vibration sensor exceeding said second threshold. (This is a less desired implementation since it does not sum the instantaneous amplitudes, therefore achieving less gain.)

In the preferred embodiment the mechanical detection sensor is comprised of a pair of independent and leveraged simple pendulums. Pendulums are very efficient in transferring external acceleration energy into swinging motion, especially simple pendulums, and they retain imparted energy, accumulating imparted energy over time. This makes them superior candidates for seismic detection. Studies have shown that the maximum energy levels in seismic events typically fall within a band of frequencies, and those events with the probability of having the highest energy density fall into an even smaller band of frequencies. The pendulums used in the present invention are designed to be sensitive and selective seismic vibration sensors with a high probability of detecting seismic activity and rejecting other vibrations.

Since each pendulum is tuned to a different frequency, the pendulums are predominantly out of phase. This out of phase condition allows the pendulum system to have peak sensitivity equal to the sum of the sensitivities of the individual pendulums. The selectivity of the tuned pendulums to specific frequencies provides a low probability of false detections as a result of the inherent rejection of frequencies outside the frequency bands of each pendulum.

The present invention never requires set-up, calibration, or adjustment, even during manufacturing, because it is aligned completely by the force of gravity, and manufacturing tolerances are large.

The present invention's earthquake detector and alarm is unique in that it yields a high level of sensitivity to seismic vibrations, broadened high sensitivity bandwidth, high non-seismic vibration rejection, high impulse rejection, high pumping efficiency, accurate self alignment, high tolerance to variation in manufacturing, resistance to handling damage, long term protection from corrosion and contamination and a unique and beneficial set of alarm features, while using low cost materials and standard simple assembly techniques, to achieve very low cost.

These and other features of the present invention will be more fully appreciated when considered in light of the following detailed description and drawings.

BRIEF DESCRIPTION OF THE DRAWINGS

FIG. 6 illustrates an alternative to the rod-loop contactor assembly.

DETAILED DESCRIPTION OF THE INVENTION

Figure 1:
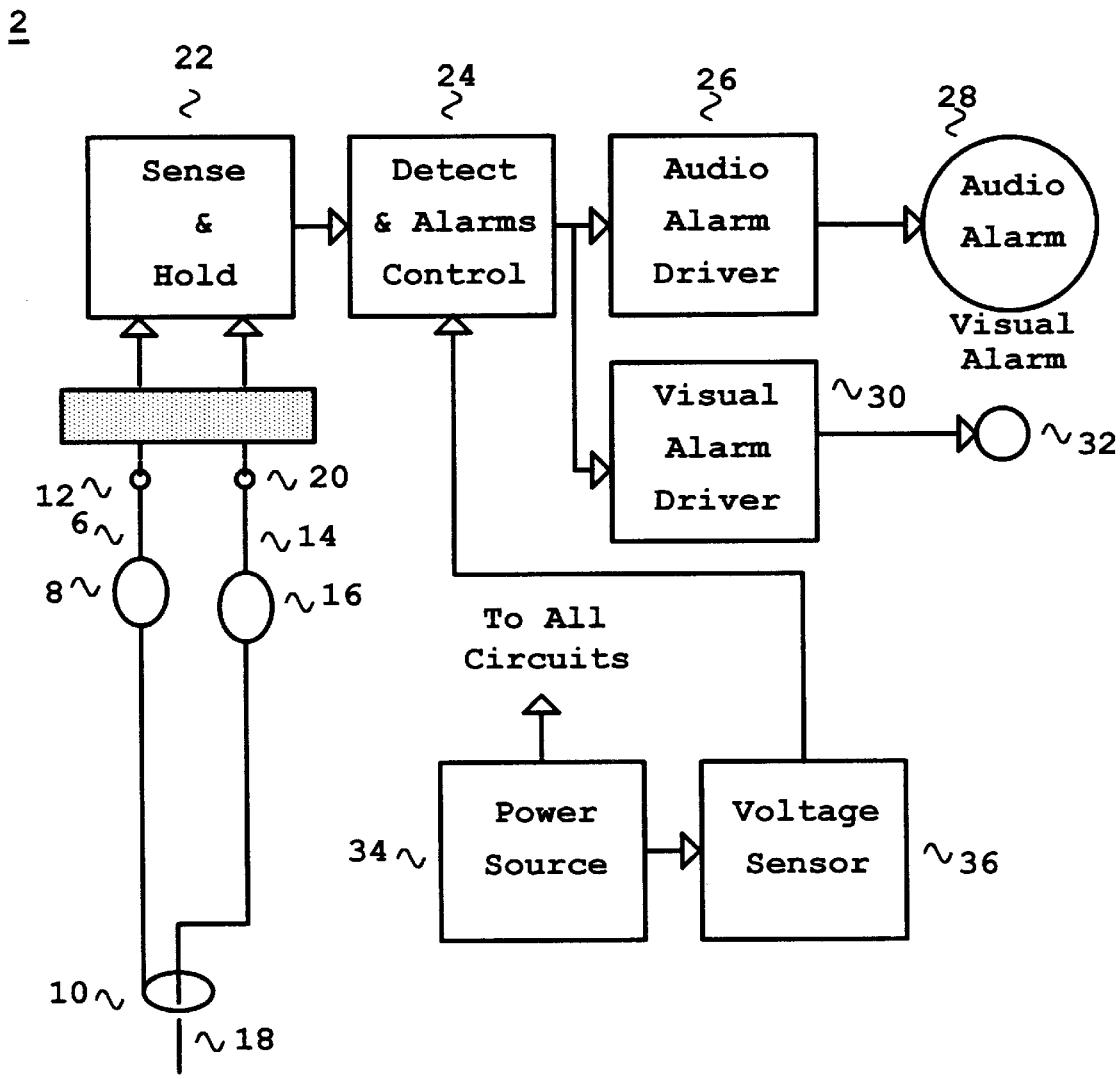
FIG. 1 illustrates a functional diagram of the preferred embodiment of the present invention.

FIG. 1 illustrates all components of the earthquake detector and alarm. The pendulum seismic detector is comprised of elements 6 through 20 in FIG. 1. In this sensor, first pendulum arm 6 is pivoted and suspended by first pendulum pivot and electrical coupling 12 at the top of first pendulum arm 6. The center frequency of the first pendulum 6–12 is determined by the distance of the first pendulum mass 8 from the first pendulum pivot and electrical coupling 12. At the end of first pendulum arm 6 there is a first pendulum electrical contactor loop 10 that makes electrical contact with the tip of second pendulum arm 14 at second pendulum electrical contactor rod 18. Second pendulum arm 14 is pivoted and suspended by second pendulum pivot and electrical coupling 20. The center frequency of the second pendulum 14–20 is determined by the distance of second pendulum mass 16 from the second pendulum pivot and electrical coupling 20.

The leverage gain of the first pendulum 6–12 is determined by one plus the ratio of the portion of first pendulum arm 6 between first pendulum mass 8 and first pendulum electrical contactor ring 10, and the portion of first pendulum arm 6 between first pendulum pivot and electrical coupling 12 and first pendulum mass 8. The leverage gain of the second pendulum 14–20 is determined by one plus the ratio of the portion of second pendulum arm 14 between second pendulum mass 16 and the point where first pendulum electrical contactor ring 10 makes contact on second pendulum electrical contactor rod 18, and the portion of second pendulum arm 14 between second pendulum pivot and electrical coupling 20 and second pendulum mass 16.

A closed electrical path is formed when first pendulum electrical contactor ring 10 is in contact with second pendulum electrical contactor rod 18.

Figure 2:
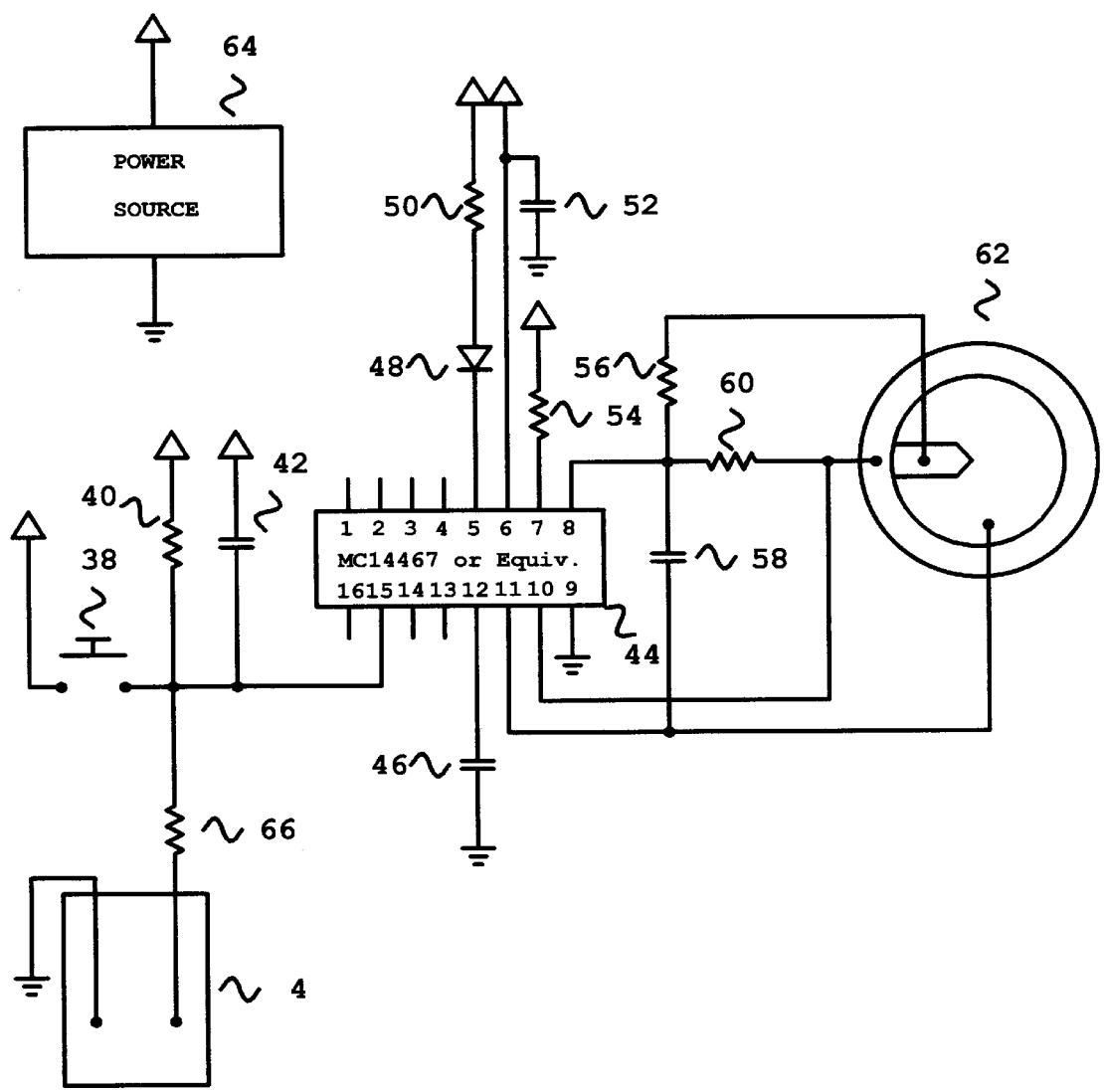
FIG. 2 illustrates an electrical circuit diagram of the preferred embodiment of the present invention shown in FIG. 1.

The sense and hold function 22 is further illustrated in FIG. 2 and is comprised of a charge storage and timing capacitor 42 and an alarm period timing resistor 40. Once the pendulum system 4 makes contact as a result of seismic activity, current passes through resistor 66 and places a charge on capacitor 42. This is held for a period determined by the value of timing resistor 40. During the period that the charge is held, the detect and alarms control 24 in FIG. 1 determines that a seismic event has occurred, and sends signals to enable the audio alarm driver 26 and visual alarm driver 30. The audio alarm driver 26 then drives the audio alarm 28, and the visual alarm driver 30 drives the visual alarm 32, with unique signals signifying that a seismic activity detection has been made.

In FIG. 2 the detect and alarm function is performed by integrated circuit 44 which in one embodiment is a MC14467. Timing capacitor 46 and timing resistor 54 set the operating frequency and timing of all the functions in integrated circuit 44. When seismic activity is detected, a closed electrical path is formed when first pendulum electrical contactor ring 10 is in contact with second pendulum electrical contactor rod 18, this causes integrated circuit 44 to send signals to piezoelectric transducer audio alarm 62 and light emitting diode 48. First feedback resistor 56, second feedback resistor 60 and feedback capacitor 58 control and provide feedback from the piezoelectric transducer audio alarm 62. Light emitting diode 48 blinks at a very low rate to indicate that the system is powered and operational, and blinks at a high rate to indicate that the system has detected seismic activity. Visual alarm current limiting resistor 50 sets the on-current of light emitting diode 48.

In FIG. 1 the system is powered by the power source 34. In FIG. 2 the system is powered by source 64 which is a battery for self contained operation or alternatively a circuit that converts normal household power, (line voltage) to a level needed for the circuitry. Decoupling and filtering capacitor 52 provides decoupling and filtering for power source 64 output voltage. In FIG. 1 the voltage sensor 36, which is contained in integrated circuit 44 in FIG. 2, senses when the power source voltage is below an acceptable level and then sends a signal to the detect and alarms control 24. The detect and alarms control 24 senses the status of the signal from the voltage sensor 36 that signifies a low power voltage condition. The detect and alarms control 24 then sends a signal to the audio alarm driver 26, and to the visual alarm driver 30. The audio alarm driver 26 then drives the audio alarm 28 and the visual alarm driver 30 drives the visual alarm 32 with unique signals signifying that a power source low voltage has been sensed. If the system is battery operated, this alarm signals the user that the battery is low and should be replaced. A momentary disable switch is provided by switch 38.

It should be noted that the alignment of pendulum seismic detector sensor 4 is automatic. The first pendulum 6–12 and second pendulum 14–20 are manufactured so the stationary rest position of second pendulum electrical contactor rod 18 is aligned to the center of the stationary rest position of first pendulum electrical contactor ring 10 by gravity. Moderate tilting of the body of the present invention, to which the first and second pendulums are attached, will not alter this alignment since gravity assures that they are aligned.

Further sensitivity can be achieved by extending the shaft of the pendulum(s) 6 and 14 to some distance farther below the pendulum mass. The electrical contactors 10 and 18 are placed at the end of this extension. Because of these shaft extensions, less angular swing is required to make the pendulums contact one another. This method provides a leverage gain in the pendulums.

Figure 3:
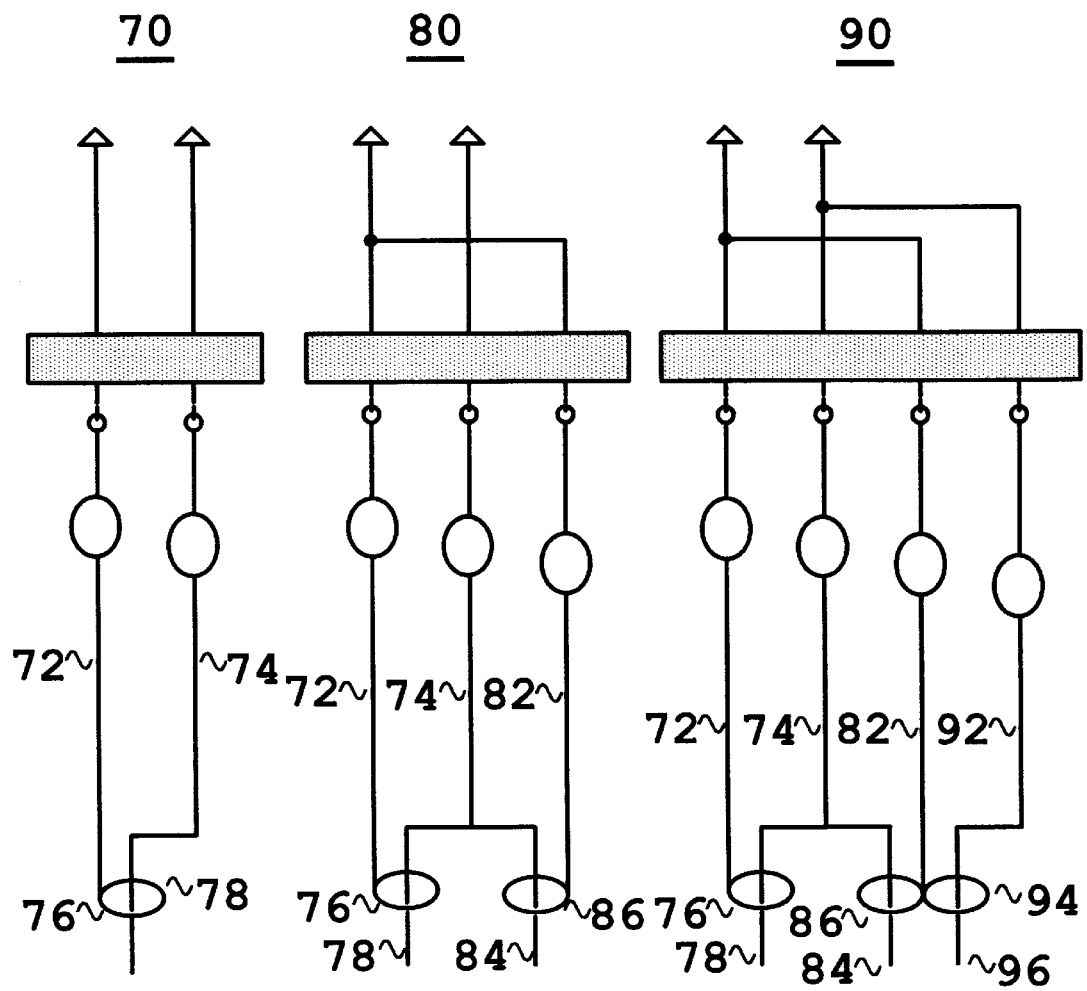
FIG. 3 illustrates how additional pendulums can be added to the two pendulum implementation, in a series connection.
Figure 4:
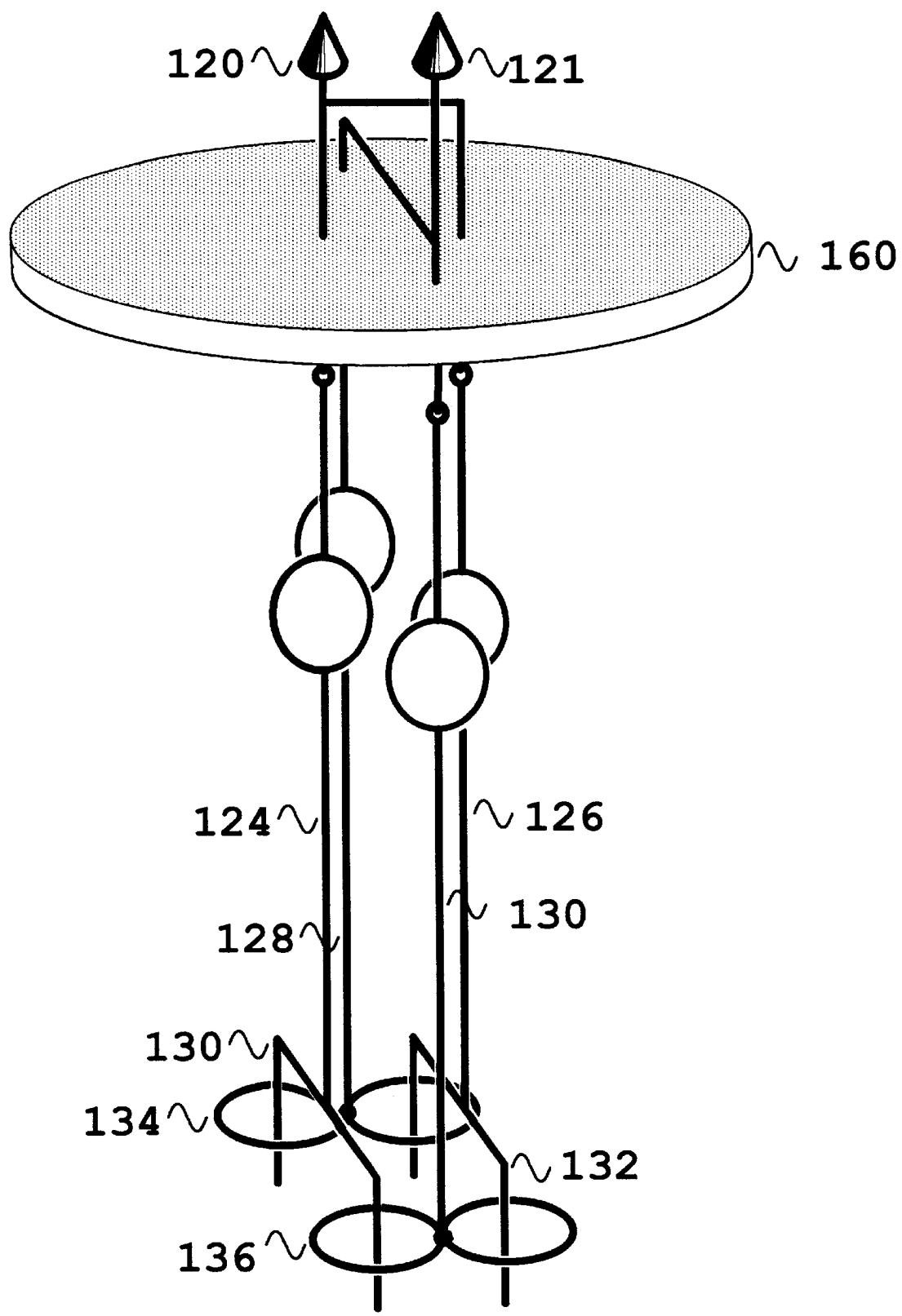
FIG. 4 illustrates how a more complex interconnect of a multiplicity of pendulums is possible.

While the pendulum system of the present invention is shown with only two pendulums, this system may employ more than two pendulums by adding contactor loops and/or rods to each additional pendulum. As shown in FIG. 3, generally at 70, two simple leveraged pendulums 72 and 74 are connected by placing a contactor 76 and 78 at the end of the leverage rods. A third pendulum 82 can be added to form a three pendulum sensor, generally at 80, by including a second contactor 84 and 86. A fourth pendulum 92 can be added to form a four pendulum sensor, generally at 90, by including a third contactor 94 and 96. The leveraged swing of each adjacent pendulum pair is summed in the pair's common contactor. For example, in the four pendulum sensor, generally at 90, the two right pendulums 82 and 92 are summed by the right contactor 94 and 96. There is no theoretical limit to the number of pendulums and contactor pairs that can be added. Other connections of contactors for multiple pendulums are possible, to take advantage of more pendulum pairs. One such means of interconnect implemented for a four pendulum sensor is illustrated in FIG. 4, elements 120–160. This four pendulum sensor is still able to operate in the preferred embodiment by connecting rod connections 120 and 121 in FIG. 4 in place of 12 and 20 in FIG. 1. The sensor in FIG. 4 would provide four sums, 128 plus 124, 124 plus 130, 130 plus 126, and 126 plus 128. Furthermore, it is within the scope of the present invention to substitute a pair of any other type of vibration sensors for the two pendulums, such as a mass on a spring, and to add additional vibration sensors for a total of three, four, or more, and to add leverage to these vibration sensors to get leveraged gain.

Figure 5:
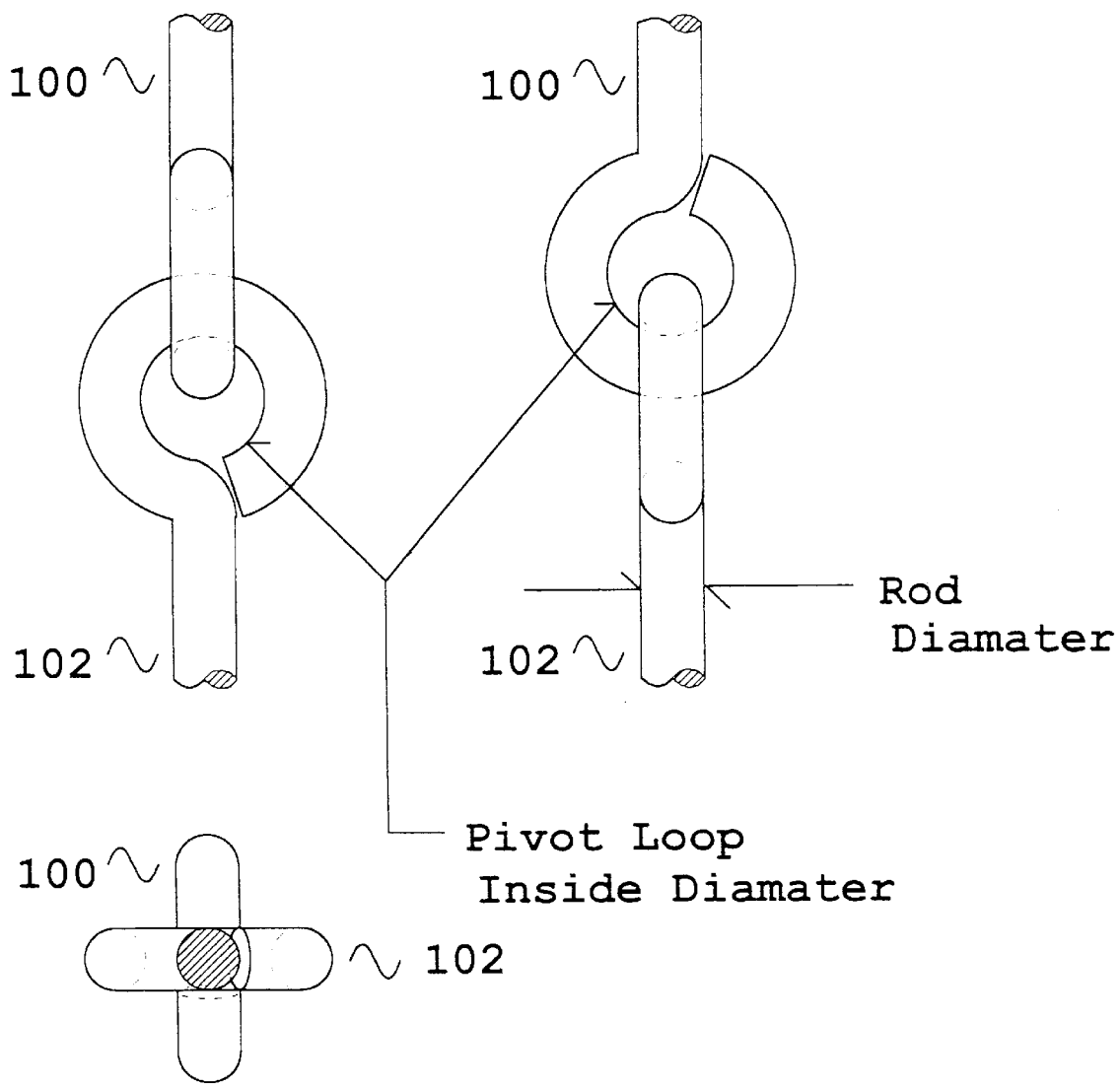
FIG. 5 illustrates pivot loop inside diameter as compared to rod diameter.

Pendulum pivot loop size for elements 12 and 20 in FIG. 1 affects the sensitivity of the pendulums 6 and 14 to vibrations, and it affects the rotational alignment of the pendulums 6 and 14. Pivot loops are illustrated in FIG. 5 with element 100 being the stationary loop which is fastened to the case of the earthquake detector, and element 102 is the rod for pendulums 6 and 14 in FIG. 1. It is important to note that loop size is not the actual inside diameter of the whole loop, it is the diameter of the inside curvature of the loop at the point where the stationary pivot 100 and the pendulum pivot 102 make contact. As the size of the loop is increased, the losses in the loop reduce. This is obvious in the limit where the loop is nearly the same size as the rod, which causes the pivot loop 102 to rotate in the stationary loop 100, in a fixed position. As the loop size increases, the pivot loop 102 is free to rock in stationary loop 100, without having to overcome any break-away friction. A minor lifting of the pivot rod 102 occurs as it rocks up the inner curvature of stationary pivot 100, but with the loop of adequate size, and at small angles of swing for the pendulum, this affect is negligible. The size of the pivot loop inside diameter of the loops 100 and 102 where they make contact must be at least 1.5 times the diameter of the rod used in the loops, to minimize friction. Contactor design can vary, without affecting the performance of a pair of contactor summed pendulums. The loop-rod contactor shown in FIG. 1 elements 10 and 18 can be replaced by a loop-loop contactor as illustrated in FIG. 6, elements 200 and 201, or other suitable electrical, mechanical, light, sound, magnetic, proximity or contact sensing elements. Since a mechanical contactor will close with a very low force, it is important to have a contactor element that wipes as it makes contact. This wiping action acts as a cleaning action, and increases the probability of contact. Because of the nature of the swing arms, the probability that the contacts will meet in a wiping orientation is almost 1.0, thus decreasing the importance of contact design.

The higher the pendulum pumping efficiency in a simple pendulum, a compound pendulum, or a pendulum system, the higher the sensitivity to vibration the device will have. Pumping gain suffers when the pendulum is not a simple pendulum, due to the inertia of the pendulum mass, or when there are more than negligible losses in the pendulum pivot.

Also, the larger the cross section of the pendulum, the larger the loss is due to air friction. The present invention's sensor optimizes pumping gain by using a simple pendulum, a pivot loop diameter-to-rod ratio of at least 1.5, with a high density/low cross section mass. This provides a significantly improved sensitivity over prior art.

Contact contamination is of paramount importance, even though the contact is wiping. A small piece of lint will be removed by the wiping action, but a small amount of corrosion or cigarette tar may not. Therefore the surface of the contactor must be a material that will not corrode in the environment that it is exposed to. Therefore, in the preferred embodiment, the contactor contacts and the pivot must be made of a highly conductive material that will not corrode in the enclosed atmosphere. The preferred embodiment, illustrated in FIG. 9, includes a sealed chamber 222 in which the pendulums 226 and 228, and their pivots and contactor are contained. During manufacturing, the chamber 222 is injected with an inert gas, such as nitrogen or helium. Also, the contactor contact surfaces are a material that will not corrode in this gas. An alternate implementation would be to use gold plating, or another material with a low propensity to corrode, in an atmosphere that is at least filtered to keep out contaminants such as cigarette tar.

Figure 7:
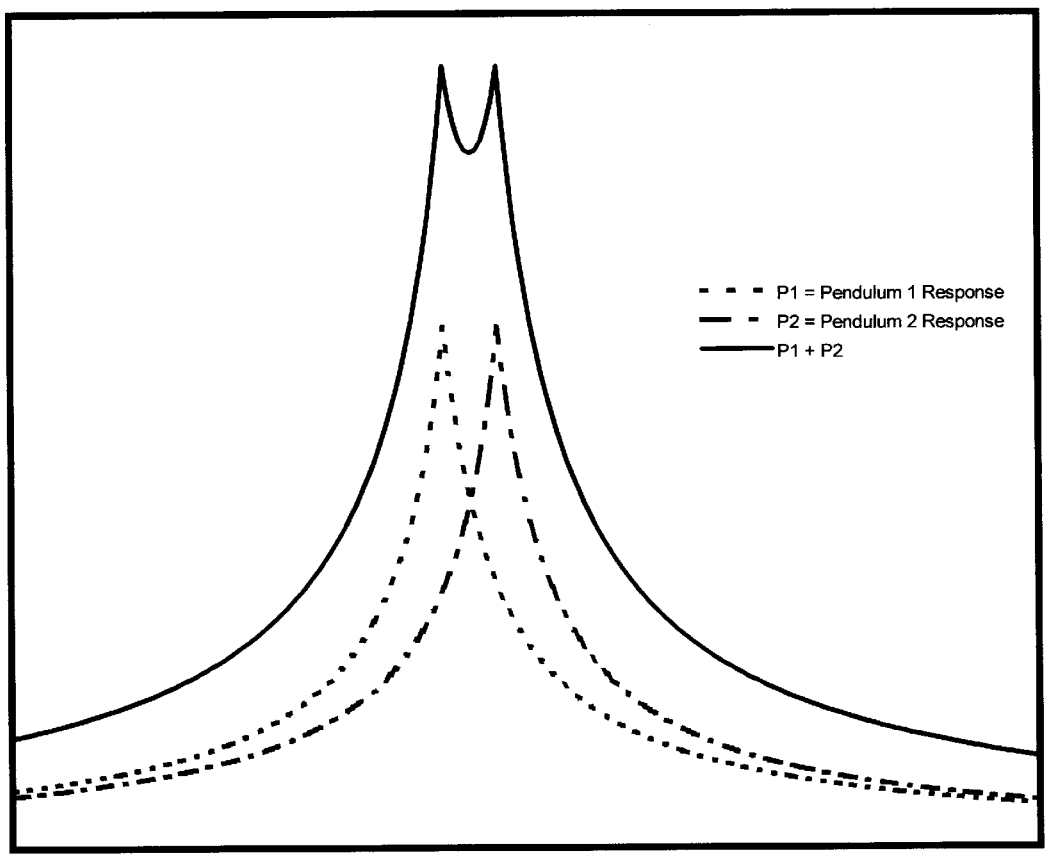
FIG. 7 illustrates the summing gain achieved in a two simple pendulum sensor.

The summing of two or more leverage gain simple pendulums is a significant improvement over prior art. The two summed simple pendulums 6 and 14 are set at adjacent natural frequencies where the bandpass of the individual pendulums overlap. This overlap increases the gain (sensitivity to vibration) over that of the individual pendulums, as illustrated in FIG. 7. The peak sensitivity of the sensor is increased, making it sensitive to lower level seismic vibrations. The higher gain of the multiple simple pendulum sensor also allows the sensor to have a larger contactor gap, for a given sensitivity, thus allowing greater manufacturing tolerances, which result in lower cost. The bandwidth of the sensor is also increased as a result of having overlapping bandpasses, increasing the width of the portion of the seismic vibration spectrum that the sensor is sensitive to, allowing greater seismic energy within the desired band to affect the sensor. The increased seismic energy that is pumped into the sensor also increases the sensor sensitivity. The summation of adjacent bandpasses increases the rate of sensitive roll-off at the edges of the combined sensitivity band, as compared to the roll-off of either of the individual simple pendulum bands, providing improved out-of-band rejection.

Figure 8:
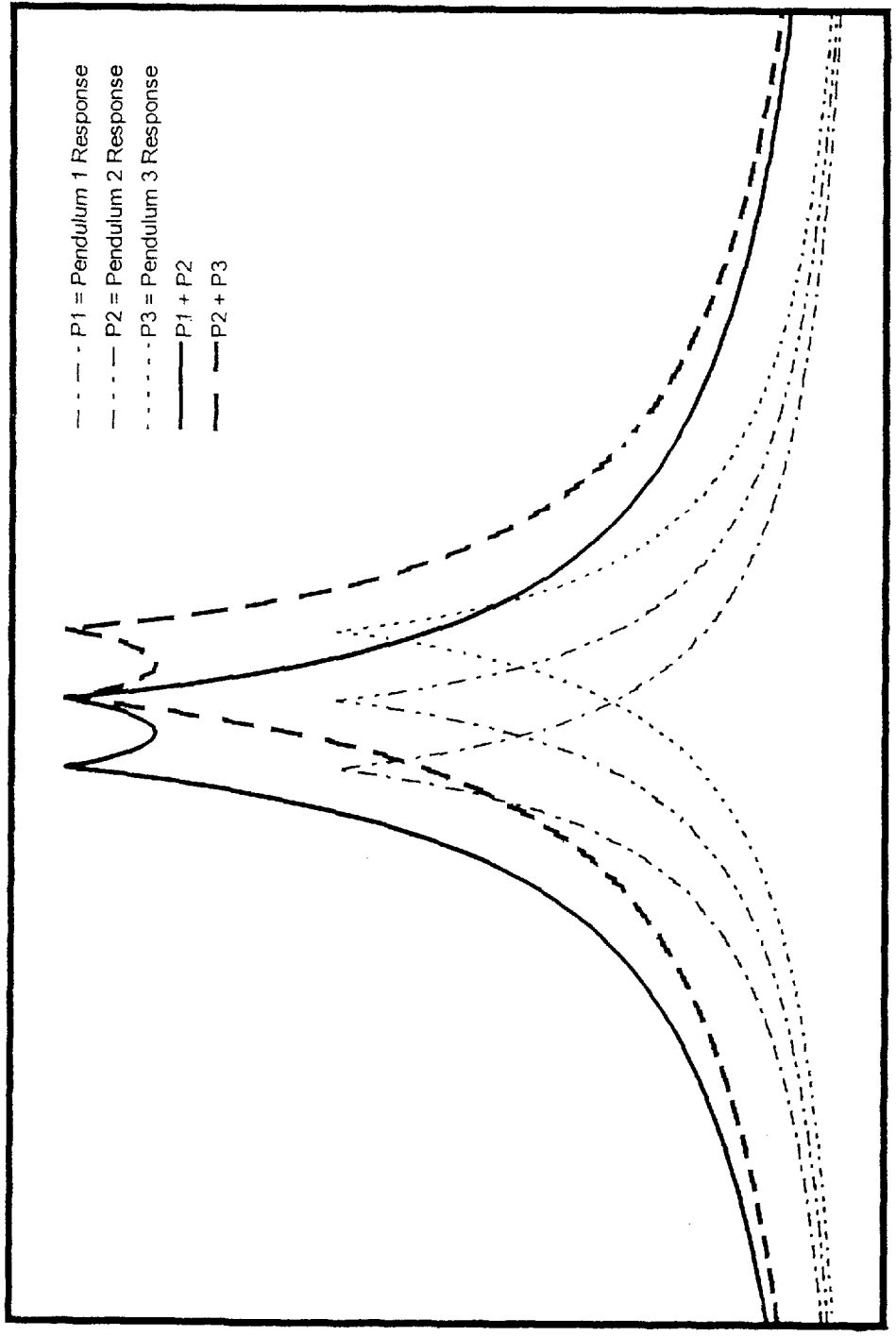
FIG. 8 illustrates the summing gain achieved in a three simple pendulum sensor.

Additional pendulum(s) as shown in two additional alternatives in FIG. 3, generally at 80 and 90, at other natural frequency(s) will cause additional summing of their bandpasses resulting in a net gain (sensitivity to vibration) improvement over two pendulums as shown in FIG. 8. This technique provides significant improvement over prior art "single compound" pendulum, "single simple pendulum" or "single pendulum system" sensors.

The ability of the present invention's sensor to reject impulse displacements provides a significant improvement when compared with prior art. For example, a slammed door may cause the entire assembly to follow an impulse deflection (quickly move from a rest position, to a displacement, then quickly move back to the original rest position.) In a single pendulum sensor such as Anderson's or Burke's, or in a pendulum system such as Gitlis's, the sensor must be able to differentiate between this rapid displacement and a displacement within the desired band of interest. This is especially important when leverage gain is present. The present invention's implementation solves this problem by having equal lengths from the couplings 12 and 20 to the contactors 10 and 18, and nearly the same simple pendulum rod lengths from 12 to 8 and 20 to 16. With this implementation, the element 10 in the contactor will swing more closely to the same distance as element 18 in the contactor as a result of an impulse displacement of the structure to which the earthquake detector is attached. For example, a simple pendulum with a leveraged gain of two, (where the length of rod between the pivot and the mass is the same length as the length of rod between the mass and the contactor), where the pivot is attached to earth and a second contactor element is attached to earth, will close the contactor gap distance by exactly twice the actual displacement of earth caused by the impulse. This leveraged single pendulum example has an impulse rejection of 2.0 as compared with the present invention's impulse rejection of 0.56 in the preferred embodiment. (The lower the number, the better the rejection.) The response a sensor shows far above the band of interest is inherently like its impulse response. Therefore, the improved impulse rejection will also improve the rejection to all frequencies significantly above the band of interest, improving (decreasing) the rate of false detections. This reduction in false detections will increase the probability of the user keeping the earthquake sensor and alarm operational, thus providing an improvement in user safety, and an improvement over prior art.

In the preferred embodiment, the upper rod in the pivots is permanently connected directly to the earthquake detector case. This assures precise gravity alignment of the contactor rod and ring, (or other configuration) for an implementation using a multiplicity of pendulums. The total length of the pendulums and their leverage from 12 to 10 and from 20 to 18 must be equal. The part of the pendulum rods that connect to the contactor can be lengthened or shortened to increase or decrease leveraged gain, but the overall lengths of all the rods must remain equal to assure leveling. Additionally, if the mass for each pendulum is concentrated close to the axis of the rod, emulating a point mass as closely as possible, an error in equal distribution of mass around the axis of the rod, (more mass on one side of the rod than the other), will not appreciably affect the angle that the pendulum hangs when it is quiescent. This is accomplished in the preferred implementation by using a high density oval or cylindrical shaped mass. The alignment's sensitivity to mass distribution is much larger in compound pendulums such as one of the pendulum elements in the Gitlis implementation. A comparable mass distribution error in a compound pendulum element like Gitlis's will cause a large alignment error. This improvement in the present invention's sensor results in less stringent manufacturing tolerances which inherently yields reduced cost. The need to check alignment after manufacturing is eliminated in the present invention's sensor. The combination of mass close to the rod axis and equal total rod lengths provides a significant improvement in alignment over prior art.

In the preferred embodiment, every pendulum is connected directly to the earthquake detector case, which is coupled to the earth. In addition to providing inherent gravity alignment, this coupling provides a direct path from earth to each pendulum element so the energy is not attenuated by a pendulum element which has a different bandpass, such as the series connected elements in a Gitlis pendulum system. The present invention's implementation could use a multiplicity of pendulum systems, where the sum of the pendulum systems is taken. However, manufacturing considerations such as less stringent manufacturing tolerances, and no need to check alignment after assembly, result in lower cost and drive the implementation to the present invention's dual pendulum implementation.

Mechanical integrity, as measured by a device's ability to survive a large level of shock and vibration, is an important consideration in the cost of any instrument. Design features that inherently are more susceptible to lower levels of shock and vibration must be compensated for either in additional design features, or by protecting the device with additional packaging considerations when it is moved or shipped. For example, the Gitlis design uses a very large mass pendulum system that is supported by a tip of a point-in-a-cone. This design must employ a lock-down feature to avoid damage when handled and shipped, or it must employ a more complex packaging and handling during shipment. The simple technique of using stiff rods, 6 and 14 and using relatively small masses, 8 and 16, results in a sensor mechanism that can withstand higher level of shock and vibration, including dropping the entire earthquake sensor and alarm product on a hard surface. The mechanical integrity of the present invention's sensor provides a significant improvement over the prior art of more sensitive devices.

Figure 9:
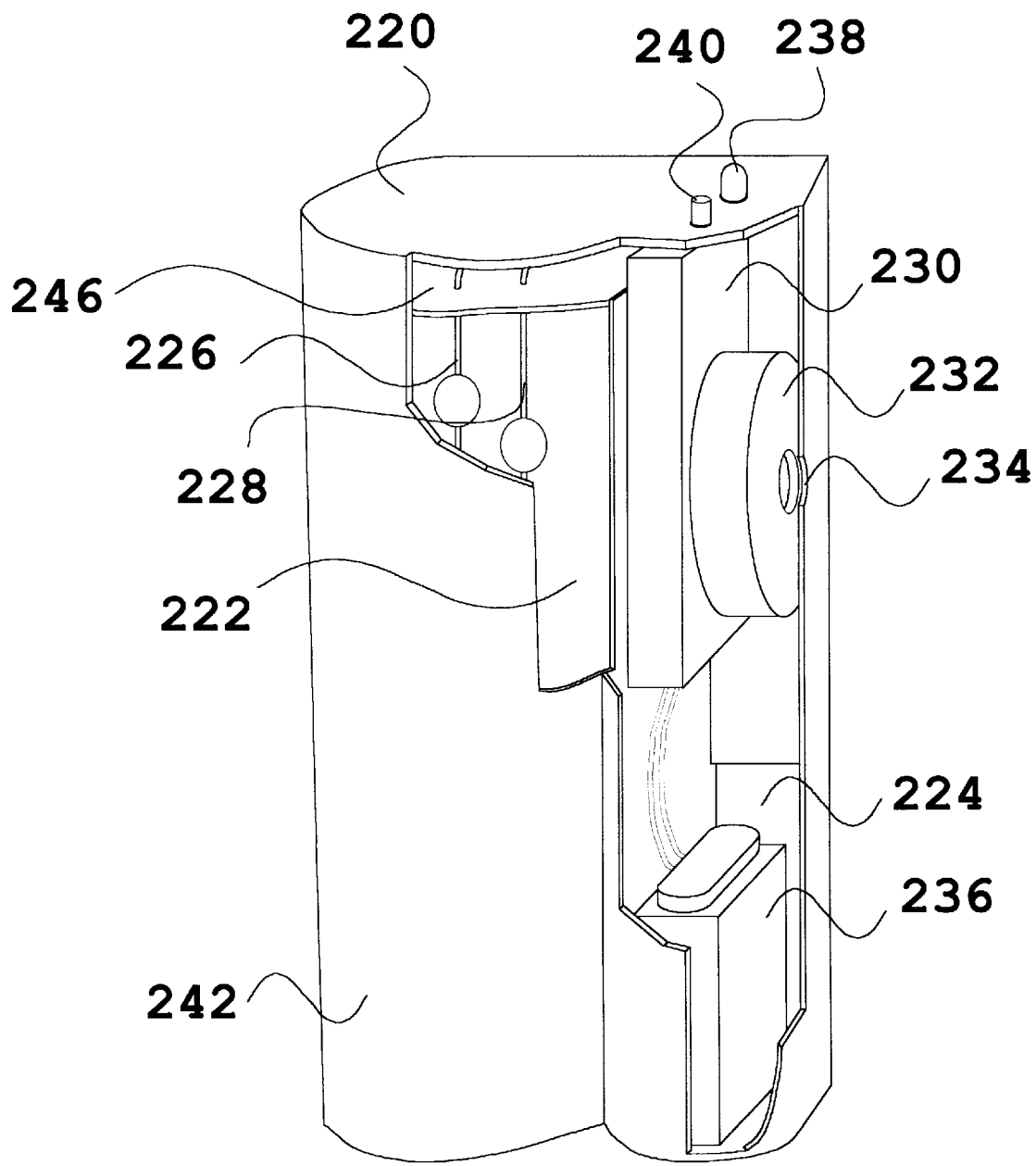
FIG. 9 illustrates one possible case and one assembly of the preferred embodiment.

The case 242 for the preferred implementation shown in FIG. 9, includes a number of features that make it unique. The sensor, comprising two simple leveraged pendulums 226 and 228 are cast into a plastic isolation plate 246 that doubles as a lid to seal an air-tight sensor chamber 222. This chamber is a part of the one piece case 242. The electronics 230 are inserted into the case, and retained by case features that are also part of the one piece case. The audio transducer projects sound through an opening 234 in the case 242. A lid 220 is snapped into the case top capturing and protecting the case electronics. The battery 236 can be installed through an opening 224 in the back of the case, which includes a mechanism for retaining the battery. The light emitting device 238 and the momentary switch 240 protrude through the cover 220, being visible and accessible to the user. An additional feature that is not included in the preferred implementation but may be added in future models, is the addition of a function to indicate that a detection was made since the last time the momentary reset switch was depressed. The existing light, or a separate light emitting device will be used for this function. Other functions can be added to this earthquake sensor and alarm with minimal change to the electronics and minimal or no changes to the case and other parts.

Figure 10:
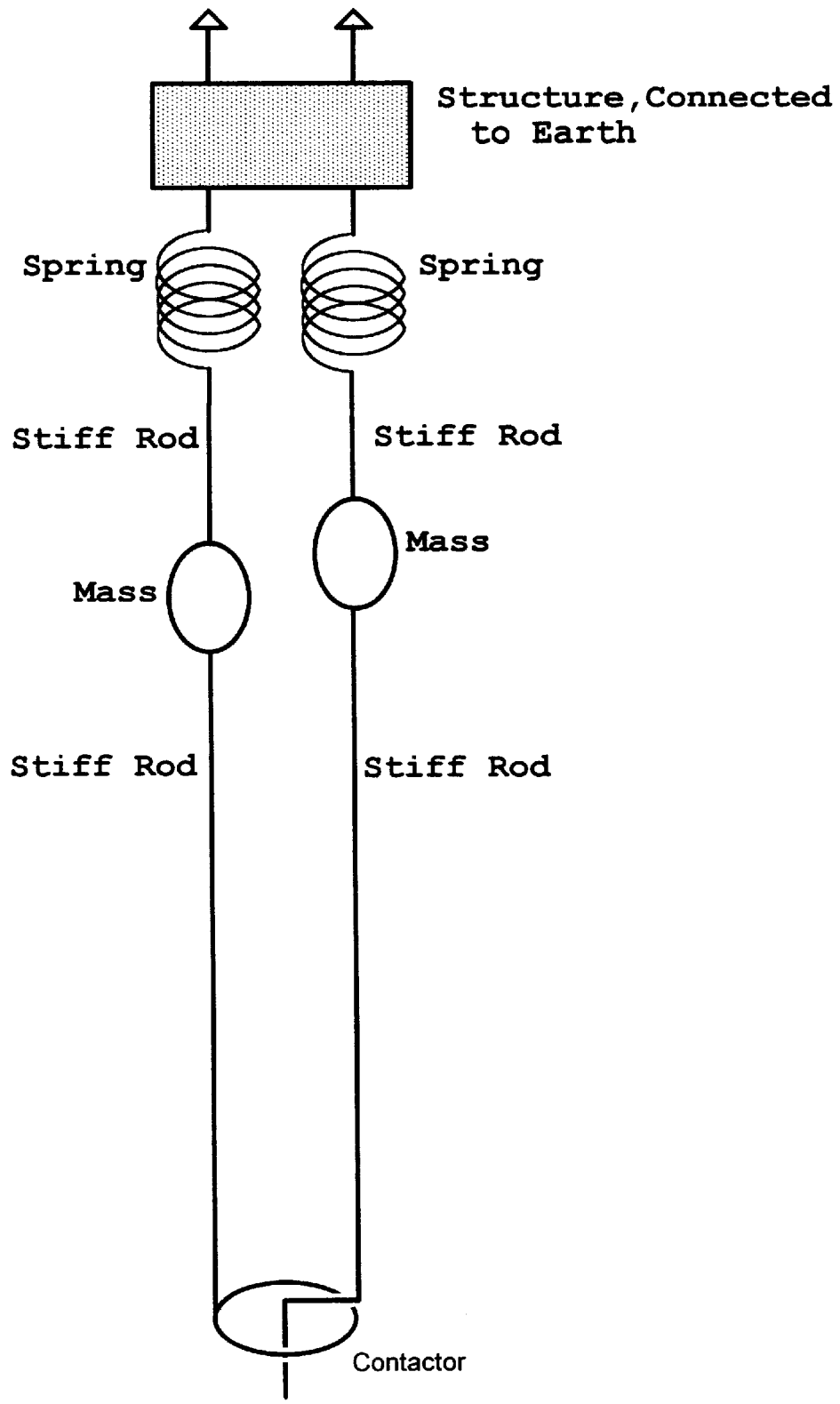
FIG. 10 illustrates an alternate implementation using springs in place of loop-to-loop pivots.

Alternate means of providing a pivot for the pendulums are obvious and numerous. One such alternate is illustrated in FIG. 10, where springs are used in place of the loop-to-loop pivot. It is obvious to one skilled in physics that this alternative, and the use of a variety of other types of pivots, will provide essentially the same functionality as the preferred embodiment.

Figure 11:
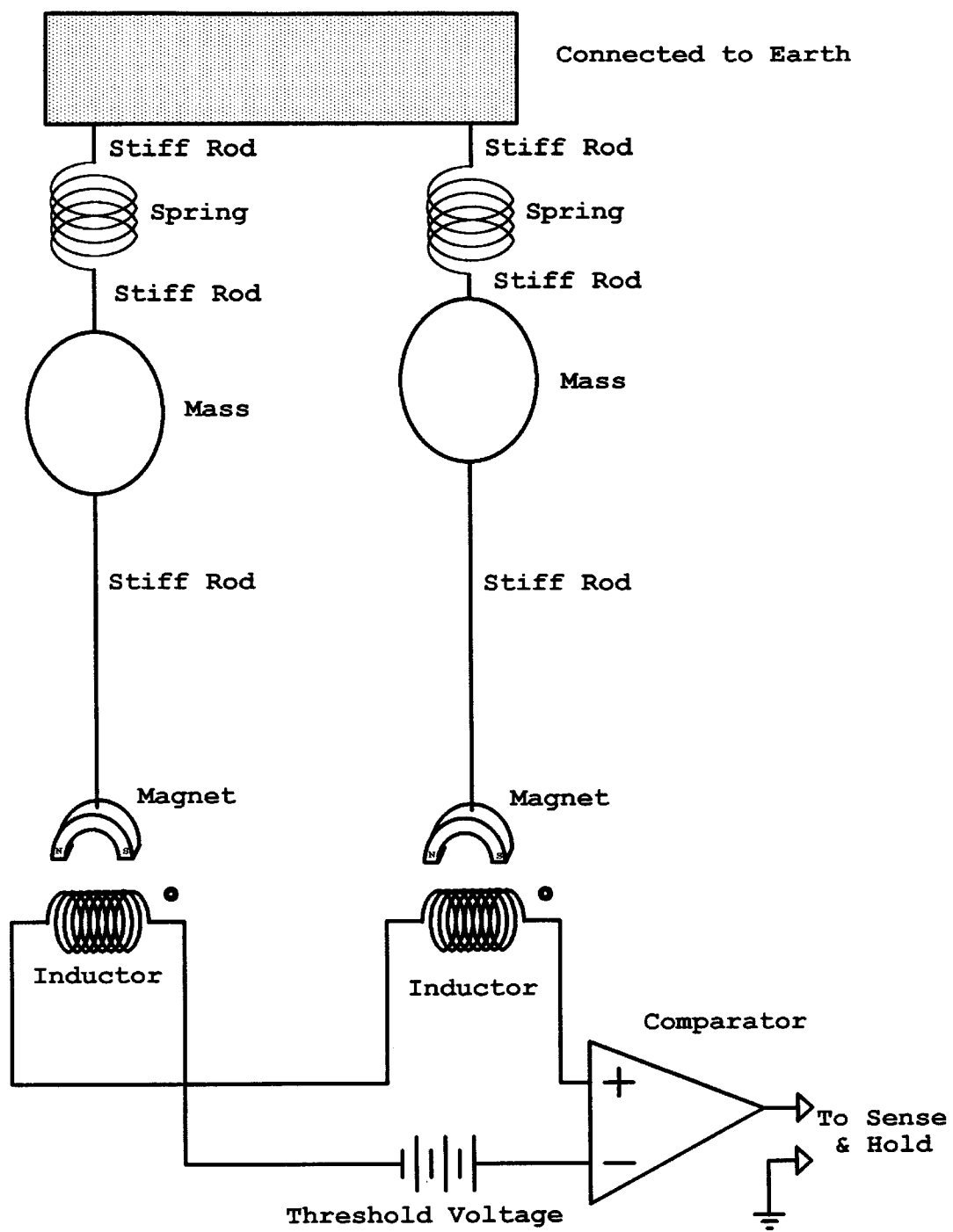
FIG. 11 illustrates an alternate implementation using springs instead of loop-to-loop pivots, and magnets, inductors, and a voltage comparator instead of a contactor.

Alternate means of providing a contactors are also obvious and numerous. One such alternative is illustrated in FIG. 11. The upper end of the pivot springs are connected to earth through the earthquake detector case. The inductors, are also connected to earth through the earthquake detector case. When the case is subjected to seismic vibrations, the pendulums will swing, swinging the magnets, and the resulting movement of the magnetic fields will induce a voltage across each inductor. A series circuit is formed with the two inductors and a threshold voltage source. When the summed voltages of the inductors exceeds the threshold voltage, it will be sensed by the comparator and the comparator output will switch to a positive voltage. This voltage can be induced into the Sense and Hold function 22, to cause an alarm. Note that the inductors are connected in an opposing manner to provide inherent impulse rejection. It is obvious to one skilled in physics that this alternative and others, using light, sound, voltage fields, and other means, provide essentially the same functionality as the preferred embodiment.

From the foregoing teachings, it can be appreciated by one skilled in the art that a new, novel, and nonobvious earthquake detector and alarm has been disclosed. It is to be understood that numerous alternatives and equivalents will be apparent to those of ordinary skill in the art, given the teachings herein, such that the present invention is not to be limited by the foregoing description but only by the appended claims.

I claim:

1. An earthquake detector and alarm device comprising:
    a) a first vibration sensor pivotally fixed to earth and tuned to a first frequency;
    b) a second vibration sensor pivotally fixed to earth and tuned to a second frequency;
    c) a summing device which sums the response of said first vibration sensor with the response of said second vibration sensor; and
    d) an alarm which sounds when the sum of the responses exceeds a predetermined threshold.

2. The device of claim 1, wherein said first vibration sensor is a first pendulum hanging from a first pivot and said second vibration sensor is a second pendulum hanging from a second pivot.

3. The device of claim 1, wherein said summing device sums the response of said first vibration sensor with the response of said second vibration sensor over time.

4. The device of claim 1, wherein said alarm is an electrical circuit.

5. The device of claim 4, wherein said electrical circuit includes an audio alarm and a visual alarm.

6. The device of claim 2, wherein said predetermined threshold is exceeded when the sum of the responses of said first pendulum and said second pendulum causes said first pendulum and said second pendulum to collide.

7. The device of claim 6, wherein the collision occurs between portions of each pendulum which extend beyond the center of mass from the pivot.

8. The device of claim 2, wherein said pendulums each comprise a thin rod with a pivot at one end and a high density mass at the other end.

9. The device of claim 6, wherein said pendulums are each approximately the same length from the pivot to the point of collision.

10. The device of claim 1 wherein said first vibration sensor is tuned to a first frequency with a first bandpass frequency range and said second vibration sensor is tuned to a second frequency which has a second bandpass frequency range that overlaps said first bandpass frequency range.

11. An earthquake detector and alarm device comprising:
    a) a first vibration sensor pivotally fixed to earth;
    b) a second vibration sensor pivotally fixed to earth and not mechanically coupled to said first vibration sensor;
    c) a summing device which sums the response of said first vibration sensor with the response of said second vibration sensor; and
    d) an alarm which sounds when the sum of the responses exceeds a predetermined threshold.

12. The device of claim 11, wherein said first vibration sensor is a first pendulum and said second vibration sensor is a second pendulum.

13. The device of claim 11, wherein said alarm is an electrical circuit.

14. The device of claim 13, wherein said electrical circuit includes an audio alarm and a visual alarm.

15. The device of claim 11 wherein said first vibration sensor is tuned to a first frequency with a first bandpass frequency range and said second vibration sensor is tuned to a second frequency which has a second bandpass frequency range that overlaps said first bandpass frequency range.

16. A vibration detector comprising a pendulum with a pivot and an electrical contact coupled to the pendulum wherein the pendulum and electrical contact are enclosed within a chamber isolated from ambient air such that gas within the chamber cannot leak out and the chamber is filled with an inert gas.

17. An earthquake detector and alarm device comprising:
    a) a first pendulum having a first pendulum arm, a first pendulum pivot and electrical coupling disposed at the top end of said first pendulum arm and mechanically coupled to earth, a first pendulum mass disposed along the length of said first pendulum arm below said first pendulum pivot and electrical coupling, and a first pendulum electrical contactor disposed at the bottom end of said first pendulum arm;
    b) a second pendulum having a second pendulum arm, a second pendulum pivot and electrical coupling disposed at the top end of said second pendulum arm and mechanically coupled to earth, a second pendulum mass disposed along the length of said second pendulum arm below said second pendulum pivot and electrical coupling, and a second pendulum electrical contactor disposed at the bottom end of said second pendulum arm in relation with said first pendulum electrical contactor such that it may pivot into electrical contact with said first pendulum electrical contactor; and
    c) a detect and alarm control electrical circuit in electrical contact with said first pendulum pivot and electrical coupling and said second pendulum pivot and electrical coupling.

18. The device of claim 17, wherein said detect and alarm electrical circuit includes an audio alarm and a visual alarm.

19. The device of claim 17, wherein the two pendulums are of approximately equal length from their pivots to their electrical contactors.

20. The device of claim 19, wherein
    a) the first pendulum is tuned to a first frequency with a first bandpass frequency range; and
    b) the second pendulum is tuned to a second frequency which has a second bandpass frequency range that overlaps the first bandpass frequency range.

21. The device of claim 17, wherein said pendulums each comprise a thin rod with a pivot at one end and a high density mass at the other end.

* * * * *